United States Patent
Toffan et al.

(10) Patent No.: US 7,475,548 B2
(45) Date of Patent: Jan. 13, 2009

(54) VECTORABLE NOZZLE WITH PIVOTABLE TRIANGULAR PANELS

(75) Inventors: Michael Jay Toffan, Mason, OH (US); Arthur McCardle, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 579 days.

(21) Appl. No.: 11/223,606

(22) Filed: Sep. 9, 2005

(65) Prior Publication Data
US 2008/0016872 A1    Jan. 24, 2008

(51) Int. Cl.
F02K 1/00    (2006.01)
(52) U.S. Cl. ............................. 60/771; 239/265.35
(58) Field of Classification Search ............ 60/228, 60/771; 239/265.35, 265.19
See application file for complete search history.

(56) References Cited

U.S. PATENT DOCUMENTS

| | | | |
|---|---|---|---|
| 3,133,412 A * | 5/1964 | Westley ............... 239/265.39 |
| 3,612,106 A | 10/1971 | Camboulives et al. |
| 3,615,052 A * | 10/1971 | Tumavicus ............ 239/265.39 |
| 3,976,160 A * | 8/1976 | Hoch et al. ............... 181/215 |
| 4,241,876 A | 12/1980 | Pedersen |
| 4,587,806 A * | 5/1986 | Madden .................... 60/771 |
| 4,707,899 A * | 11/1987 | Singer ..................... 29/890.1 |
| 4,753,392 A * | 6/1988 | Thayer et al. ......... 239/265.29 |
| 4,813,608 A * | 3/1989 | Holowach et al. ..... 239/265.37 |
| 4,819,876 A * | 4/1989 | Thayer ................. 239/265.39 |
| 4,848,664 A | 7/1989 | Thayer |
| 4,878,617 A | 11/1989 | Novotny |
| 4,978,071 A | 12/1990 | MacLean et al. |
| 5,016,818 A * | 5/1991 | Nash et al. ............... 239/127.1 |
| H1024 H | 3/1992 | Meister |
| 5,092,524 A | 3/1992 | Garrett et al. |
| 5,103,639 A * | 4/1992 | Wolf ......................... 60/771 |
| 5,181,676 A | 1/1993 | Lair |
| 5,261,604 A | 11/1993 | Meyer |
| 5,294,055 A | 3/1994 | Garrett et al. |
| 5,437,412 A | 8/1995 | Carletti |

FOREIGN PATENT DOCUMENTS

EP    1 630 399 A2    3/2005

OTHER PUBLICATIONS

European Search Report, EP 06 12 5042, Apr. 6, 2007, 7 pages.

* cited by examiner

*Primary Examiner*—William H Rodríguez
(74) *Attorney, Agent, or Firm*—William Scott Andes; Steven J. Rosen

(57) ABSTRACT

A vectorable nozzle includes convergent and divergent sections and a throat therebetween. Heightwise spaced apart upper and lower walls outwardly bound a nozzle flowpath and extend aftwardly through the convergent and divergent sections from the nozzle inlet to the nozzle outlet. The upper wall includes triangular left and right side convergent upper panels pivotably mounted to a triangular convergent upper ramp in the convergent section along left and right side convergent angled hinge lines respectively. The upper wall further includes triangular left and right side divergent upper panels pivotably attached to a triangular divergent upper ramp in the divergent section along left and right side divergent angled hinge lines respectively. The left and right side convergent upper panels are in sealing engagement with the left and right side divergent upper panels along left and right side upper interfaces, respectively.

28 Claims, 14 Drawing Sheets

VECTORABLE NOZZLE WITH PIVOTABLE TRIANGULAR PANELS

BACKGROUND OF THE INVENTION

Field of the Invention

The invention relates to aircraft gas turbine engine two-dimensional vectoring nozzles and, more particularly, for such nozzles designed to shift center of nozzle exhaust flow sideways to effect vectoring.

Aircraft designers and particularly those designing high speed highly maneuverable military aircraft are constantly seeking better ways for controlling the aircraft and increasing its maneuverability in flight. These are needed for anti-aircraft missile avoidance and other combat maneuvers. Additionally, aircraft designers are trying to improve short take off and landing capabilities of aircraft. Exhaust systems, particularly for modern, high speed, military aircraft, have been adapted to provide a high degree of maneuverability over a wide variety of flight conditions including altitude, speed, and Mach number while maintaining cruise efficiency.

Aircraft maneuverability may be provided by aircraft control surfaces such as wing flaps or ailerons or vertical fins or rudders. Aircraft control surfaces, however, are somewhat limited in their effectiveness because of large differences in operational flight conditions such as air speed. Aircraft control surfaces also increase an aircraft's radar signature making it more vulnerable to anti-aircraft fire and missile. These control surfaces are attached to the airframe with hinges. The hinges and resulting hinge lines reflect enemy radar. During use, these control surfaces interrupt the aerodynamic shape of the airframe further amplifying the return of enemy radar.

It is, thus, highly desirable to provide an aircraft gas turbine engine with a thrust vectoring and low radar observability. It is also desirable to provide such a nozzle with a variable throat area (A8) and afterburning thrust augmentation (desirable for loaded takeoff and evasive maneuvers). It is also desirable to provide such a nozzle with the ability to vary the nozzle exit area (A9) as well to provide for A9/A8 variation to optimize performance over an aircraft's mission.

SUMMARY OF THE INVENTION

A vectorable nozzle includes convergent and divergent sections in serial downstream flow relationship with a throat therebetween and extending aftwardly from a two-dimensional flow nozzle inlet to a nozzle outlet. Triangular left and right side convergent upper panels are pivotably mounted to a triangular convergent upper ramp in the convergent section along left and right side convergent angled hinge lines, respectively. Triangular left and right side divergent upper panels are pivotably attached to a triangular divergent upper ramp in the divergent section along left and right side divergent angled hinge lines, respectively. The left and right side convergent upper panels are in sealing engagement with the left and right side divergent upper panels along left and right side upper interfaces, respectively.

In an exemplary embodiment of the nozzle, the left and right side divergent upper panels and the left and right side convergent upper panels outwardly bound a portion of a nozzle flowpath of the nozzle, the left side convergent and divergent upper panels are operable to pivot inwardly into the nozzle flowpath while the right side convergent and divergent upper panels pivot outwardly from the nozzle flowpath, and the left side convergent and divergent upper panels are operable to pivot outwardly from the nozzle flowpath while the right side convergent and divergent upper panels pivot inwardly into the nozzle flowpath. The convergent section may have a constant width and the divergent section may have an aftwardly diverging width. The left and right side convergent upper panels may have convergent trailing edges overlapping curved surfaces of divergent leading edges of the left and right side divergent upper panels, respectively.

A nozzle casing having left and right sidewalls may surround convergent and divergent sections and side edges of the left and right side convergent upper panels and the left and right side divergent upper panels may be in sealing engagement with convergent and divergent conically contoured portions of the left and right sidewalls in the convergent and divergent sections, respectively.

Another embodiment of the vectorable nozzle the nozzle center plane extending aftwardly from the nozzle inlet to the nozzle outlet and an unvectored throat plane normal to the nozzle center plane. Heightwise spaced apart upper and lower walls outwardly bound a nozzle flowpath of the nozzle and extend aftwardly through the convergent and divergent sections from the nozzle inlet to the nozzle outlet. The left and right side upper interfaces are aligned in the unvectored throat plane when the throat is in an unvectored position. A pitch vectoring flap may be pivotably attached to the nozzle outlet at an aft end of the lower wall. One embodiment of the lower wall is fixed with respect to the nozzle inlet and, includes in serial downstream relationship, a fixed rectangular convergent lower ramp attached to a fixed divergent lower ramp.

Another embodiment of the lower wall is variable and includes a pivotable rectangular convergent lower ramp pivotably mounted with respect to the nozzle inlet along a linear convergent ramp hinge line. A pitch vectoring flap is pivotably attached to the nozzle outlet at an aft end of the lower wall. The vectoring flap substantially defines an equilateral triangle having a base pivotably attached to the nozzle outlet at the aft end of the lower wall and the vectoring flap extending aftwardly from the base to an apex.

Yet another embodiment of the variable lower wall includes a pivotable rectangular convergent lower ramp pivotably mounted, with respect to the nozzle inlet, along a linear convergent ramp forward hinge line. Triangular left and right side divergent lower panels located in the divergent section are pivotably mounted to the pivotable convergent lower ramp along a linear convergent ramp aft hinge line. Pivotable parallelogram shaped left and right side aftwardly swept lower panels are pivotably attached to left and right side aftwardly swept leading edges along left and right side divergent angled hinge lines of a fixed divergent lower ramp in the divergent section, respectively. The left and right side divergent lower panels are in sealing engagement with the left and right side aftwardly swept lower panels along left and right side lower interfaces, respectively. The left side aftwardly swept lower panel is in sealing engagement with the right side aftwardly swept lower panel along a center interface.

DETAILED DESCRIPTION OF THE INVENTION

Figure 1:
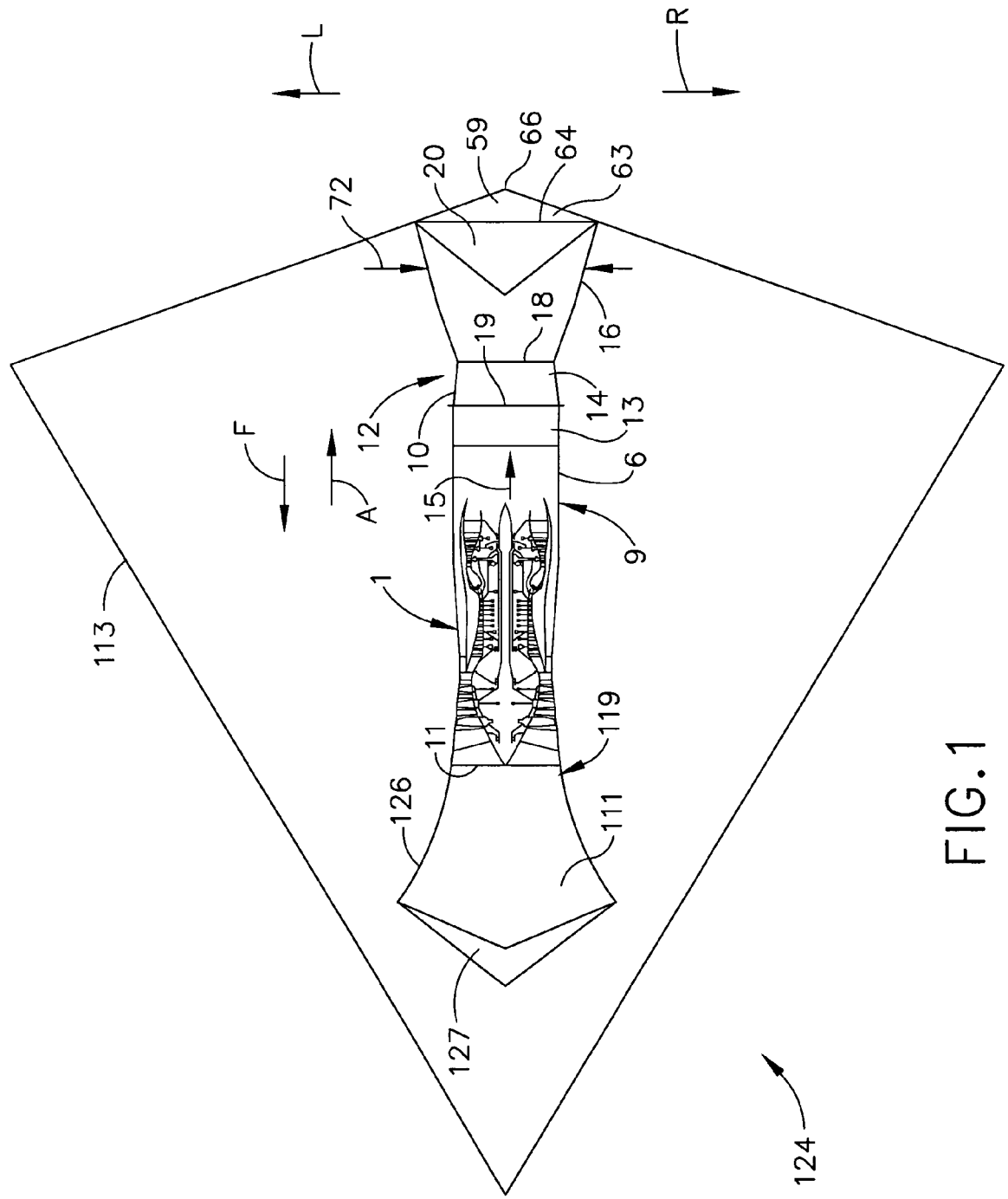
FIG. 1 is a schematical cross-sectional view illustration of a vectorable nozzle for a gas turbine engine installed in an aircraft.

Schematically illustrated in cross-section in FIG. 1 is an exemplary embodiment of an aircraft 124 having a flush mounted engine air intake 127 connected to and in fluid communication with an aircraft thrust vectoring aircraft gas turbine engine 1 mounted within the aircraft's fuselage 113. An annular fan inlet 11 of the engine 1 is connected to the air intake 127 by an engine fixed inlet duct 126. An inlet duct passage 111 of the engine fixed inlet duct 126 may be two-dimensional terminating in transition section 119 between the inlet duct passage 111 and the axisymmetric annular fan inlet 11. A vectorable nozzle 12 located downstream of the engine 1 is operable to receive an exhaust flow 15 produced by the engine 1 and vector the exhaust flow 15 sideways.

Figure 2:
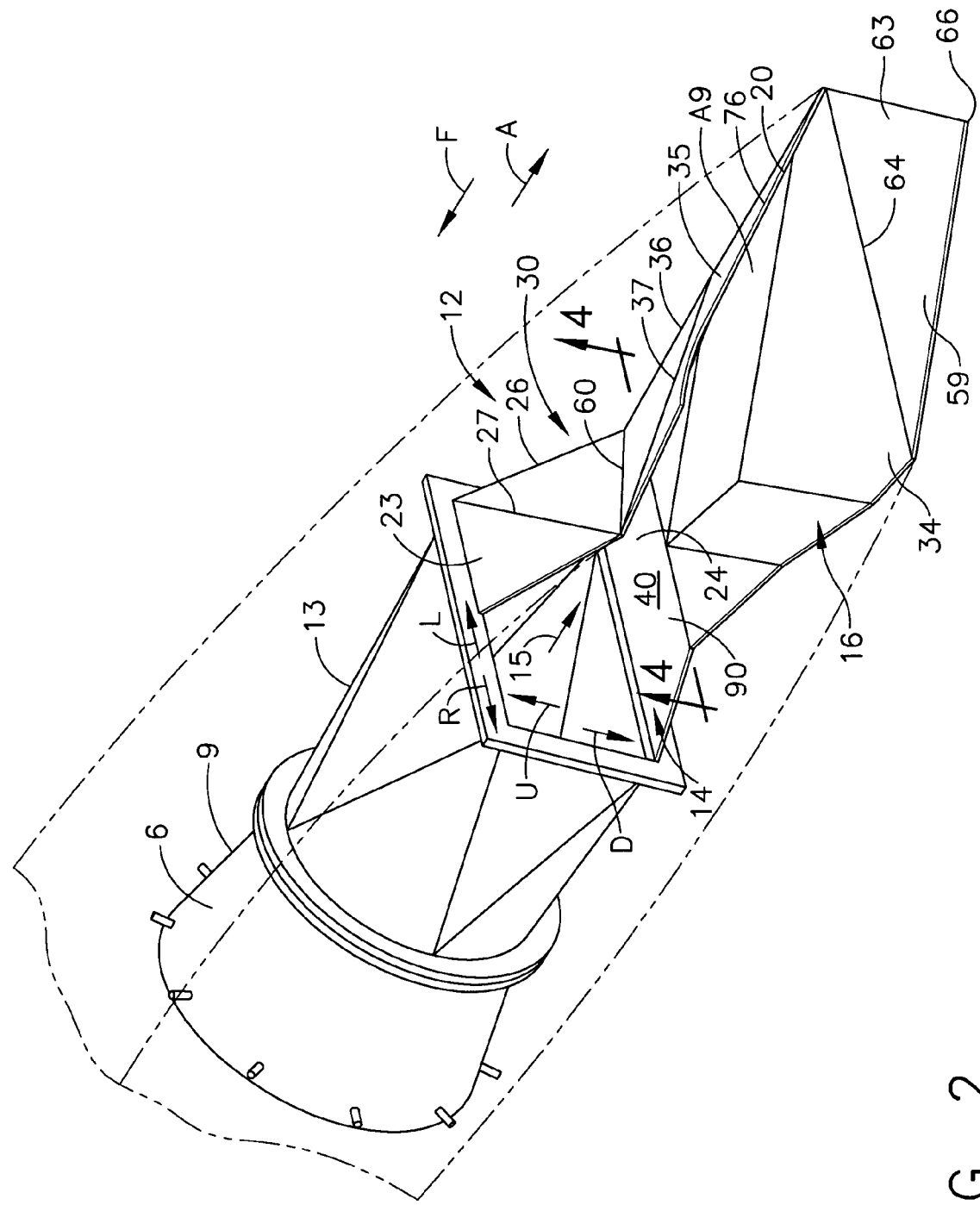
FIG. 2 is a partially cut-away perspective view illustration of the vectorable nozzle illustrated in FIG. 1.
Figure 3:
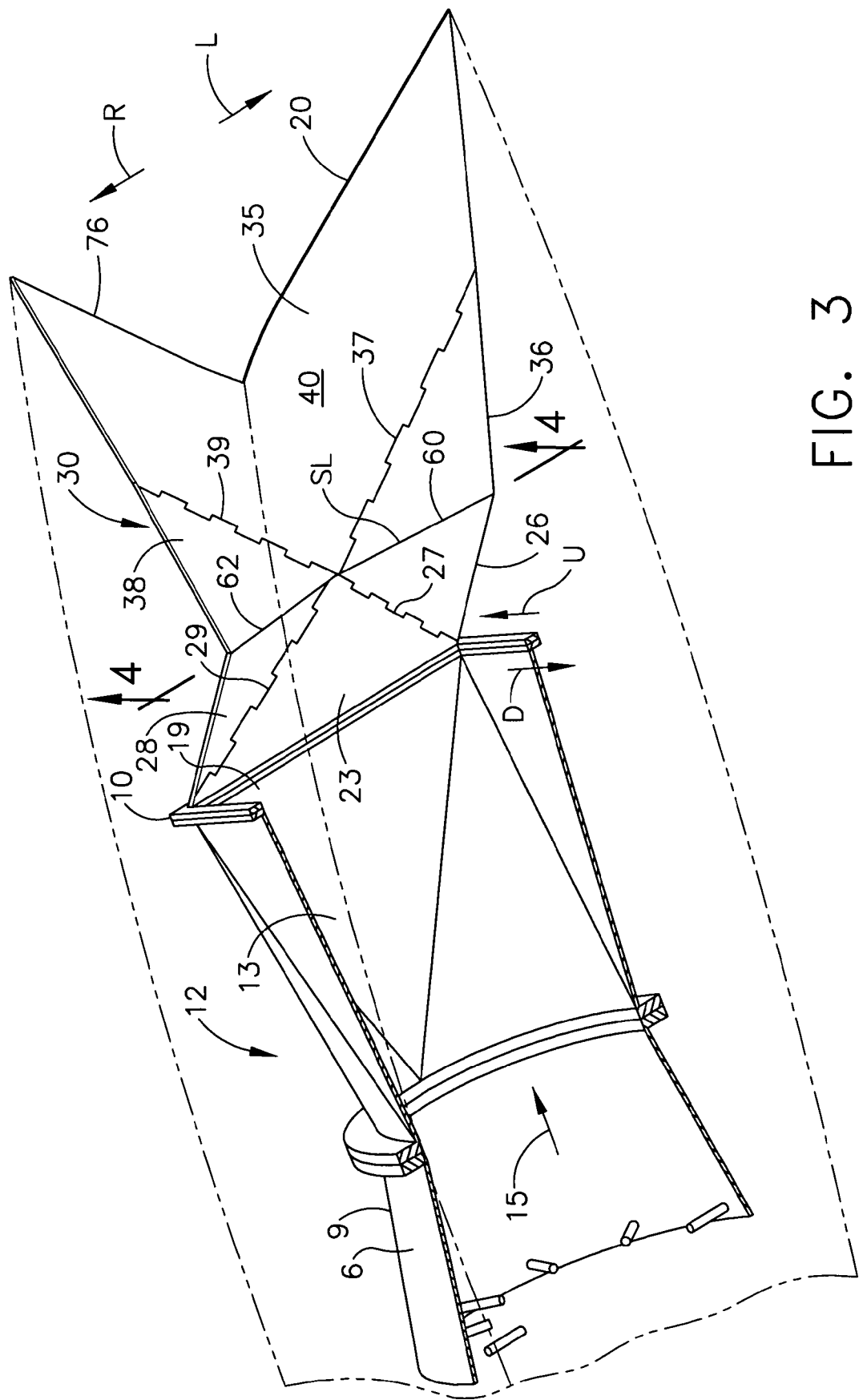
FIG. 3 is a upwardly looking perspective view illustration of an upper wall through convergent and divergent sections of the vectorable nozzle illustrated in FIG. 2.
Figure 4:
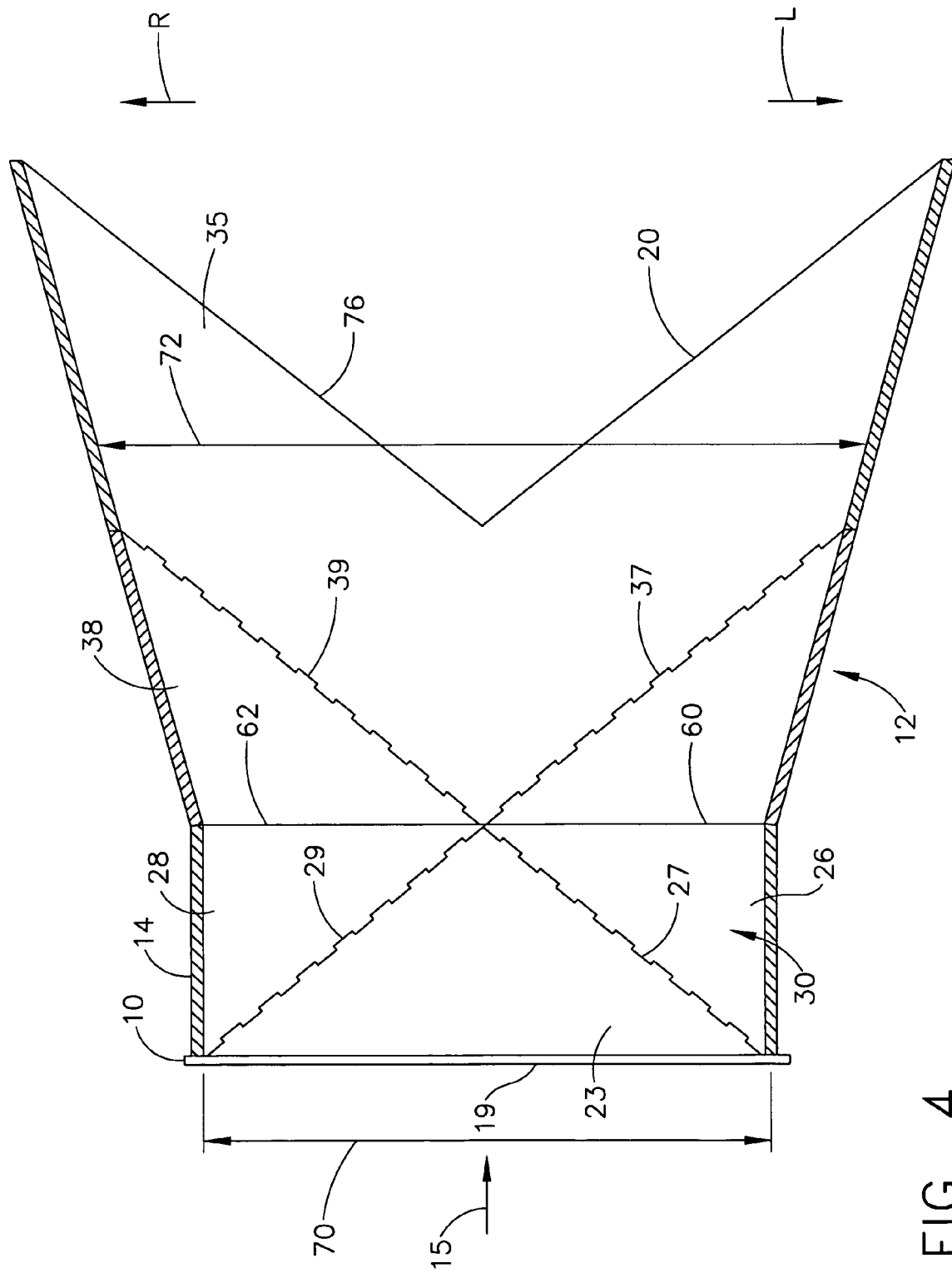
FIG. 4 is an upwardly looking planform view illustration of the upper wall illustrated in FIG. 3.

Illustrated in FIGS. 1 and 2 is an exemplary embodiment of the vectorable nozzle 12 fixedly connected to an aft end 6 of an engine casing 9 of the engine 1 by a transition duct 13. The transition duct 13 converts the exhaust flow 15 from one with a circular cross-section or axisymmetric exhaust flow 15 to one having a rectangular cross-section or two-dimensional (2D) exhaust flow 15. The nozzle 12 includes convergent and divergent sections 14 and 16 in serial flow relationship downstream of a two-dimensional flow nozzle inlet 19 at which the transition duct 13 terminates. A throat 18 is defined between the convergent and divergent sections 14 and 16 and the divergent section 16 terminates at a nozzle outlet 20.

Conventions used herein to describe the directions and frame of references for the flow and the movement of various nozzle elements include forward and aft directions F and A illustrated in FIGS. 1 and 2 by respective arrows. Sideway left and right L and R directions are illustrated by respective arrows from a frame of reference forward looking aft. Up and down directions U and D are illustrated in FIG. 2 by respective arrows. Upper and lower elements and right and left elements are used only for describing the nozzle within the illustrated reference frame and they may be reversed.

Referring to FIGS. 2-5, the vectorable nozzle 12 includes convergent and divergent sections 14 and 16 in serial downstream flow relationship with a throat 18 therebetween. The convergent section 14 of the exemplary embodiment of the vectorable nozzle 12 illustrated herein has a constant width 70 normal to the nozzle center plane 22 and the divergent section 16 has an aftwardly diverging width 72. The vectorable nozzle 12 extends aftwardly from a two-dimensional flow nozzle inlet 19 to a nozzle outlet 20. Heightwise spaced apart flowpath bounding upper and lower walls 30 and 32 outwardly bound a nozzle flowpath 40 of the nozzle 12 and extend aftwardly through the convergent and divergent sections 14 and 16 from the nozzle inlet 19 to the nozzle outlet 20.

The upper wall 30 includes triangular left and right side convergent upper panels 26 and 28 pivotably mounted to a triangular convergent upper ramp 23 in the convergent section 14 along left and right side convergent angled hinge lines 27 and 29, respectively. The upper wall 30 also has pivotable triangular left and right side divergent upper panels 36 and 38 pivotably attached to a chevron shaped divergent upper ramp 35 in the divergent section 16 along left and right side divergent angled hinge lines 37 and 39, respectively. The divergent section 16 includes a triangular trailing edge 76 defined in part by the chevron shaped divergent upper ramp 35 and defining at least in part the nozzle outlet 20.

Figure 8:
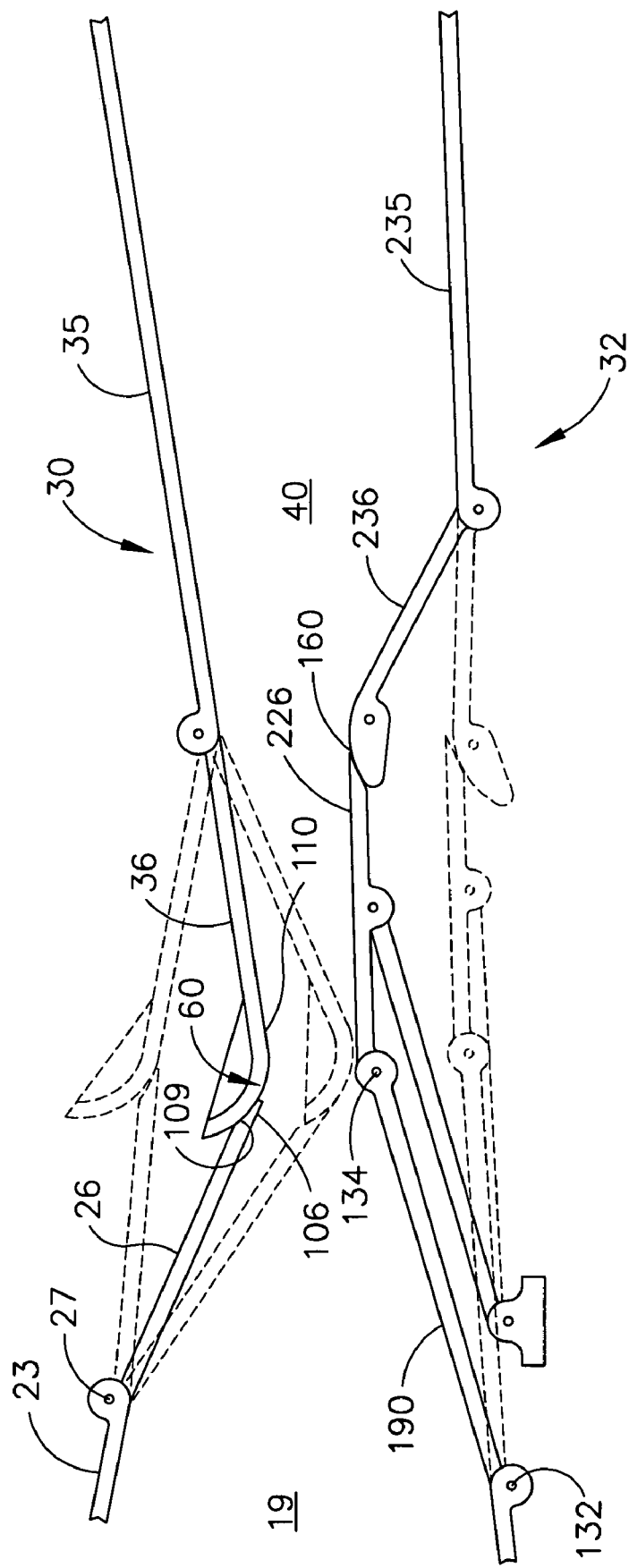
FIG. 8 is a schematical cross-sectional view illustration taken through the vectorable nozzle along 8-8 in FIG. 5.

The left side convergent upper panel 26 is in sealing engagement with the left side divergent upper panel 36 along a left side interface 60. The right side convergent upper panel 28 is in sealing engagement with the right side divergent upper panel 38 along a right side interface 62. The left and right side convergent upper panels 26 and 28 have convergent trailing edges 106 overlapping curved surfaces 109 of divergent leading edges 110 of the left and right side divergent upper panels 36 and 38, respectively, as illustrated more particularly in FIGS. 2, 3, and 8.

During engine operation, higher pressure in the convergent section 14 than in the divergent section 16 keeps the convergent trailing edges 106 of the left and right side convergent upper panels 26 and 28 sealed against the divergent leading edges 110 of the left and right side divergent upper panels 36 and 38. The curved surfaces 109 of divergent leading edges 110 provides sealing engagement of the left and right side convergent upper panels 26 and 28 with the left and right side divergent upper panels 36 and 38 along the left and right side interfaces 60 and 62, respectively, through the full range of allowable pivoting motion of the left and right side convergent upper panels 26 and 28 and the left and right side divergent upper panels 36 and 38.

Figure 5:
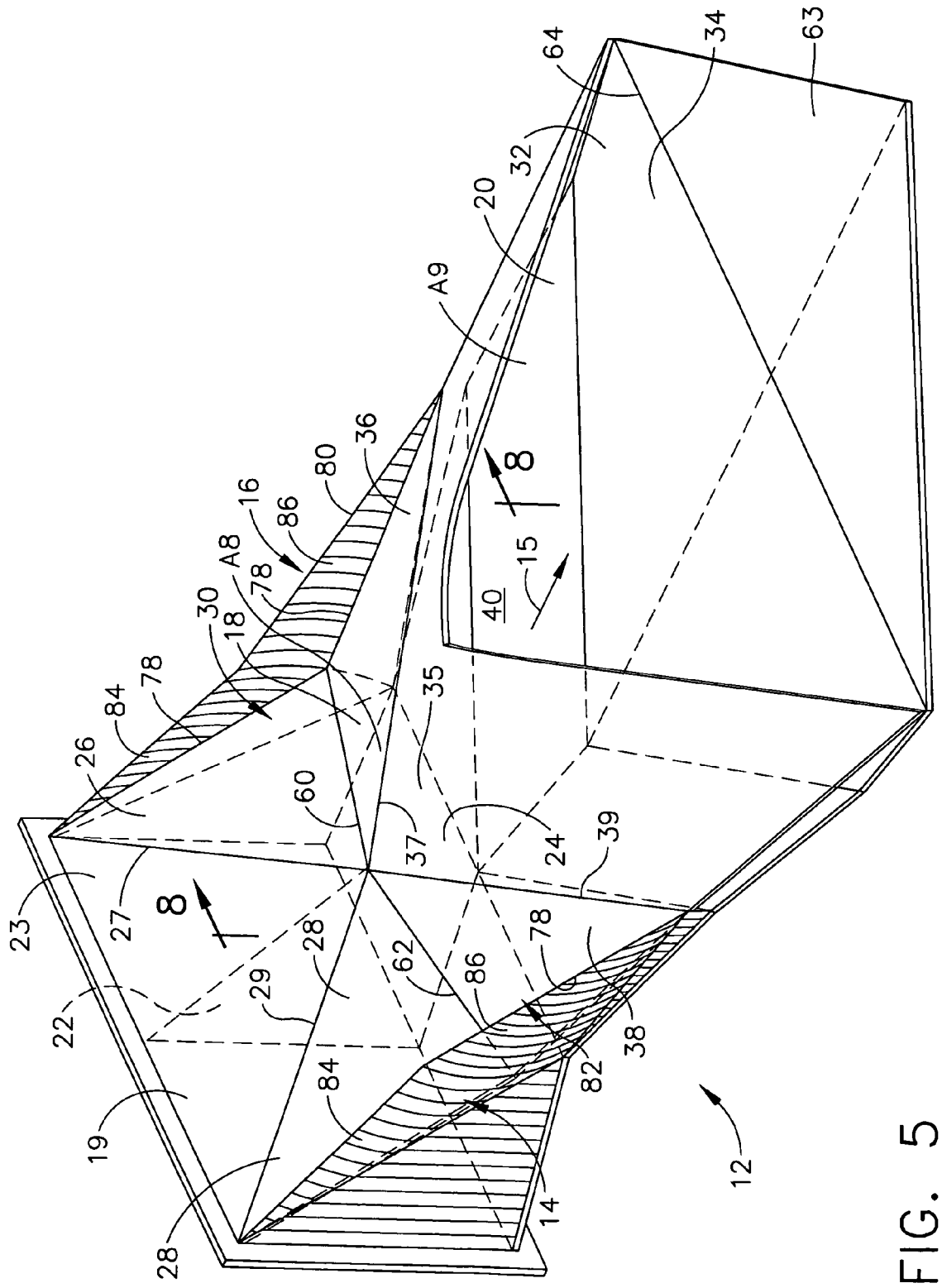
FIG. 5 is a perspective view illustration of the vectorable nozzle illustrated in FIG. 1.
Figure 6:
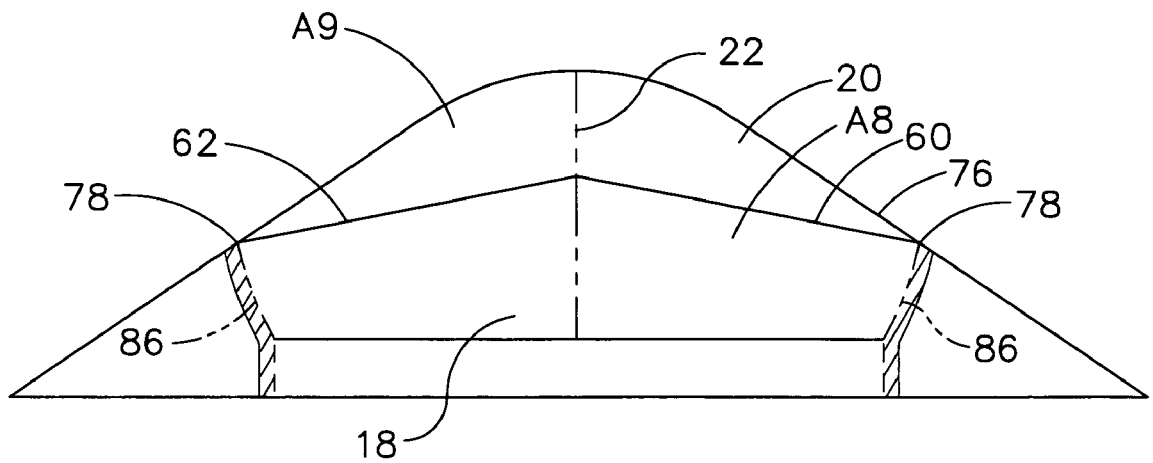
FIG. 6 is aft looking forward view illustration of the vectorable nozzle in FIG. 1 illustrating a throat of the nozzle in an unvectored position.

Referring to FIG. 5, a nozzle center plane 22 extends aftwardly from the nozzle inlet 19 to the nozzle outlet 20 and an unvectored throat plane 24 normal to the nozzle center plane 22. The left and right side interfaces 60 and 62 are aligned in the unvectored throat plane 24 when the throat 18 is in an unvectored position. A cross-section of the throat 18 in the unvectored position is illustrated in FIG. 6. The throat 18 is co-planar with the unvectored throat plane 24 and is symmetrical about the nozzle center plane 22.

Figure 7:
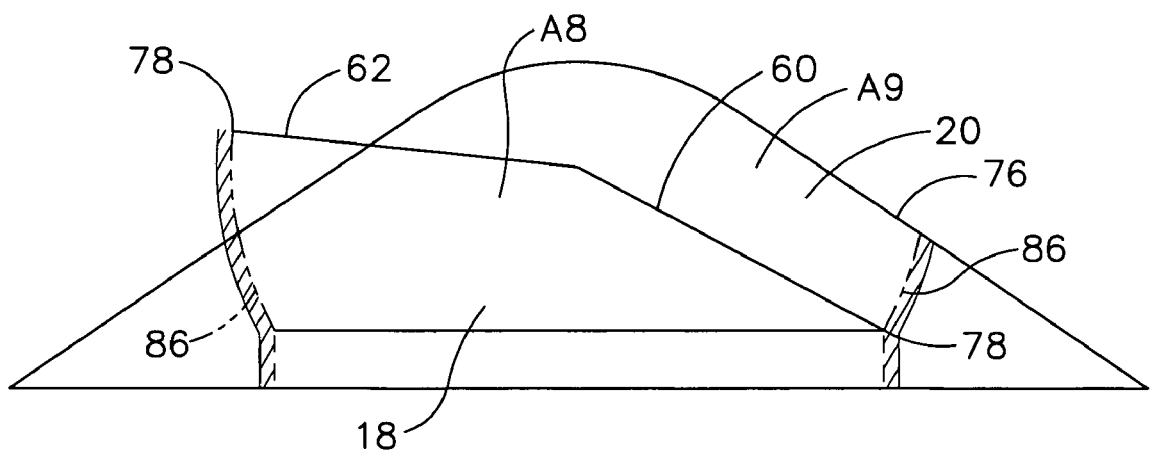
FIG. 7 is aft looking forward view illustration of the vectorable nozzle in FIG. 1 illustrating a throat of the nozzle in a vectored position.

The vectorable nozzle 12 vectors thrust in the yaw direction (right and left) by pivoting the upper panels inwardly and outwardly thus pivoting the left and right side interfaces 60 and 62 which define a shape of the throat 18. The left side convergent and divergent upper panels 26 and 36 and the left side interface 60 are operable to pivot inwardly into the nozzle flowpath 40 while the right side convergent and divergent upper panels 28 and 38 and the right side interface 62 pivot outwardly from the nozzle flowpath 40 as illustrated in FIG. 7. The left side convergent and divergent upper panels 26 and 36 and the left side interface 60 are also operable to pivot outwardly from the nozzle flowpath 40 while the right side convergent and divergent upper panels 28 and 38 and the right side interface 62 pivot inwardly into the nozzle flowpath 40.

Figure 11:
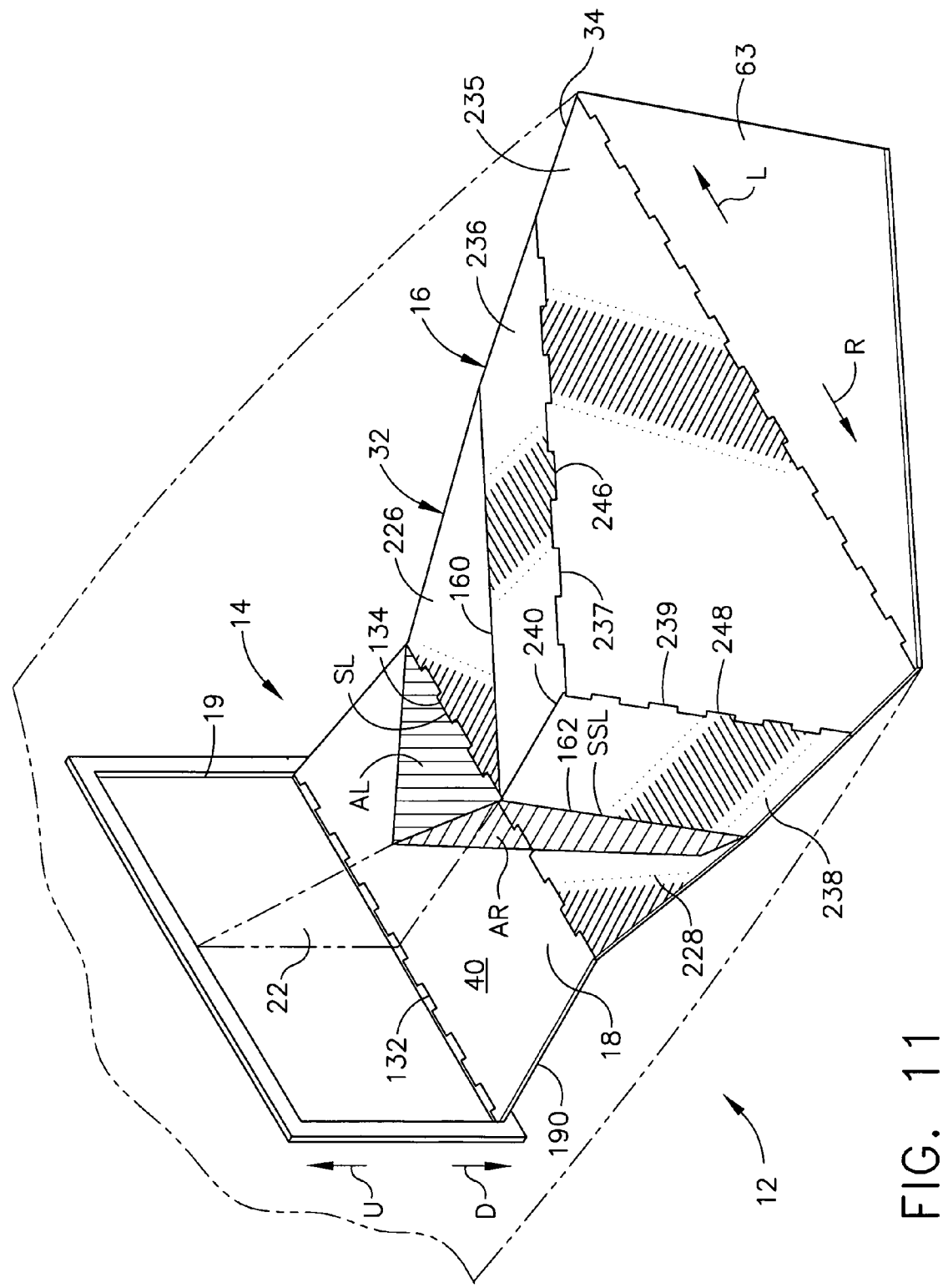
FIG. 11 is a perspective view illustration of a second variable embodiment of a lower wall of the vectorable nozzle illustrated in FIG. 5.
Figure 14:
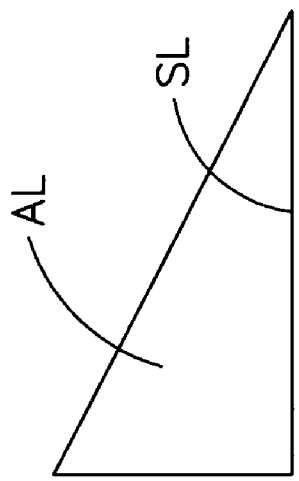
FIG. 14 is a schematical aft looking forward view illustration of a left side area of the throat taken normal to the left side area of the throat of the vectorable nozzle illustrated in FIG. 11.

Pivoting the upper panels inwardly and outwardly provides sonic line yaw vectoring by skewing or relocating the nozzle throat position and obtain a favorable pressure distribution to provide yaw vectoring. Pivoting the left side convergent and divergent upper panels 26 and 36 inwardly while pivoting the right side convergent and divergent upper panels 28 and 38 outwardly simultaneously increases a right side area AR, illustrated in FIG. 13, of the throat 18 while simultaneously decreasing a left side area AL, illustrated in FIG. 14, of the throat an equal amount. Pivoting the left side convergent and divergent upper panels 26 and 36 outwardly while pivoting the right side convergent and divergent upper panels 28 and 38 inwardly simultaneously decreases the right side area AR of the throat 18 while simultaneously increasing the left side area AL of the throat an equal amount. During vectoring a total throat area A8, the sum of the right side area AR and the left side area AL of the throat 18, remains constant. The amount of vectoring increases as the side to side area (or mass flow) ratio AR/AL increases. During maximum vectoring the sonic line on the right side area AR moves aft to the right side divergent angled hinge line 39 as illustrated in FIG. 11

Referring to FIGS. 1, 2, 5, and 9, the exemplary embodiment of the vectorable nozzle 12 illustrated herein includes a pitch vectoring flap 63 pivotably attached to the nozzle outlet 20 at an aft end 34 of the lower wall 32. The vectoring flap 63 is operable to vector thrust in the pitch direction (up and down) when it is pivoted up or down. The vectoring flap 63 has a shape of a substantially equilateral triangle 59 with a base 64 pivotably attached to the nozzle outlet 20 at the aft end 34 of the lower wall 32 and extending aftwardly from the base 64 to an apex 66.

Referring to FIGS. 5, 6, and 7, the vectorable nozzle 12 includes a nozzle casing 10 surrounding the convergent and divergent sections 14 and 16 and having left and right sidewalls 80 and 82. Side edges 78 of the left and right side convergent upper panels 26 and 28 and the left and right side divergent upper panels 36 and 38 are in sealing engagement with convergent and divergent conically contoured portions 84 and 86 of the left and right sidewalls 80 and 82 in the convergent and divergent sections 14 and 16, respectively. The convergent and divergent conically contoured portions 84 and 86 are shaped or contoured to provide the sealing engagement with the left and right side convergent upper panels 26 and 28 and the left and right side divergent upper panels 36 and 38 as they pivot about the left and right side convergent angled hinge lines 27 and 29 and the left and right side divergent angled hinge lines 37 and 39, respectively.

Figure 9:
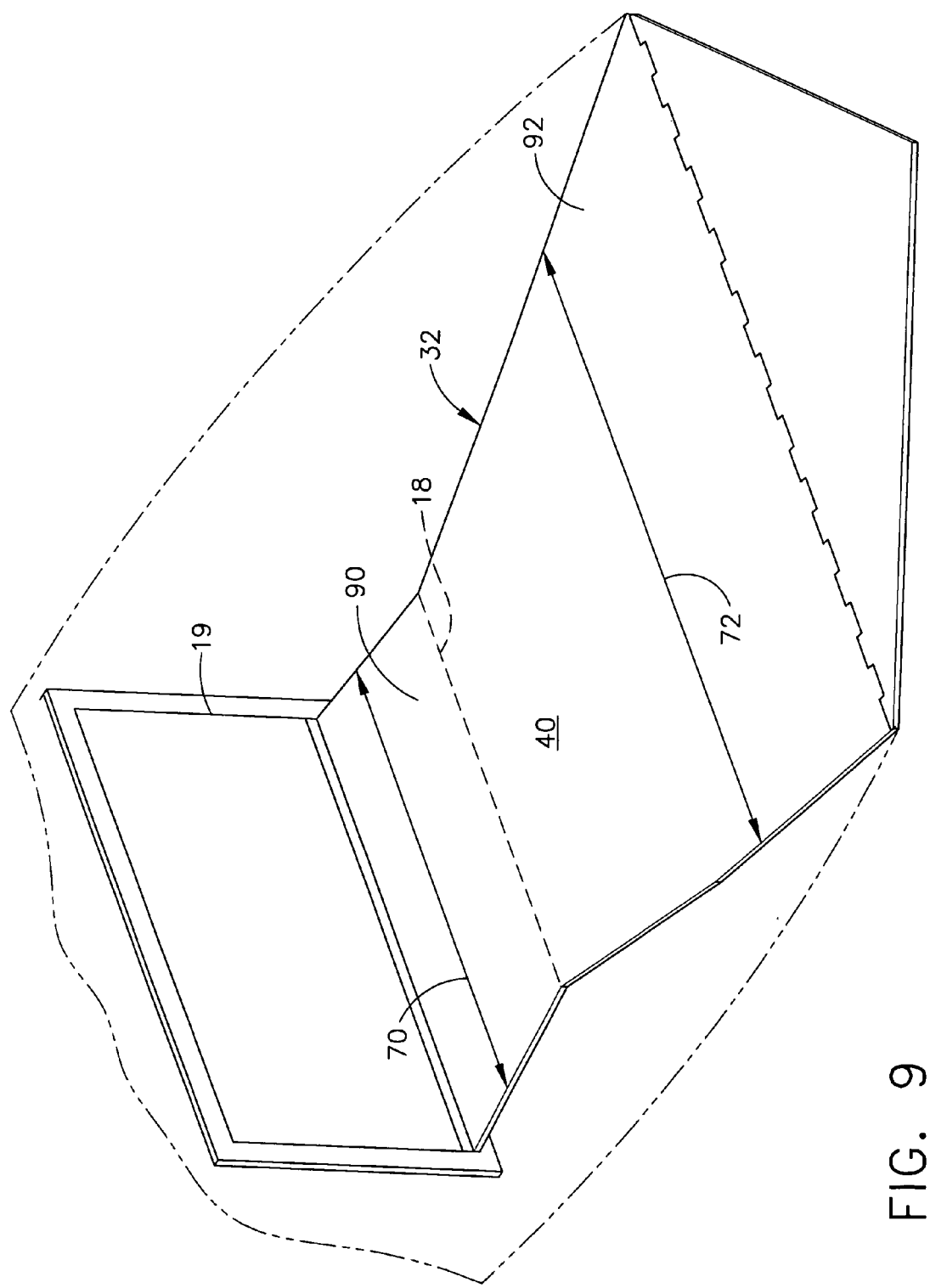
FIG. 9 is a perspective view illustration of a fixed embodiment of a lower wall of the vectorable nozzle illustrated in FIG. 5.

A fixed embodiment of the lower wall 32 is fixed from the nozzle inlet 19 to the nozzle outlet 20 as illustrated in FIG. 9. The fixed embodiment of the lower wall 32 includes in serial downstream relationship a fixed rectangular convergent lower ramp 90 attached to a fixed divergent lower ramp 92. The fixed nozzle inlet 19 and the fixed convergent and divergent lower ramps 90 and 92 are fixed with respect to the inlet 19 and the left and right sidewalls 80 and 82 of the nozzle 12. The convergent lower ramp 90 has the constant width 70 and the divergent lower ramp 92 has the aftwardly diverging width 72. This provides a fixed throat to exit area ratio A9/A8 defined as an exit area A9, illustrated in FIGS. 5 and 9, divided by the throat area A8 of the nozzle 12 illustrated in FIGS. 2 and 5.

This embodiment of the nozzle 12 can maintain a fixed throat to exit area ratio A9/A8 even during vectored operation because the left side convergent and divergent upper panels 26 and 36 and the left side interface 60 are operable to pivot inwardly into the nozzle flowpath 40 while the right side convergent and divergent upper panels 28 and 38 and the right side interface 62 pivot outwardly from the nozzle flowpath 40. Furthermore, the left side convergent and divergent upper panels 26 and 36 and the left side interface 60 are also operable to pivot outwardly from the nozzle flowpath 40 while the right side convergent and divergent upper panels 28 and 38 and the right side interface 62 pivot inwardly into the nozzle flowpath 40. Thus, by controlling the amount of pivot of the panels, this embodiment of the nozzle 12 can maintain the fixed exit to throat area ratio A9/A8 even during vectoring of the nozzle's thrust.

Figure 10:
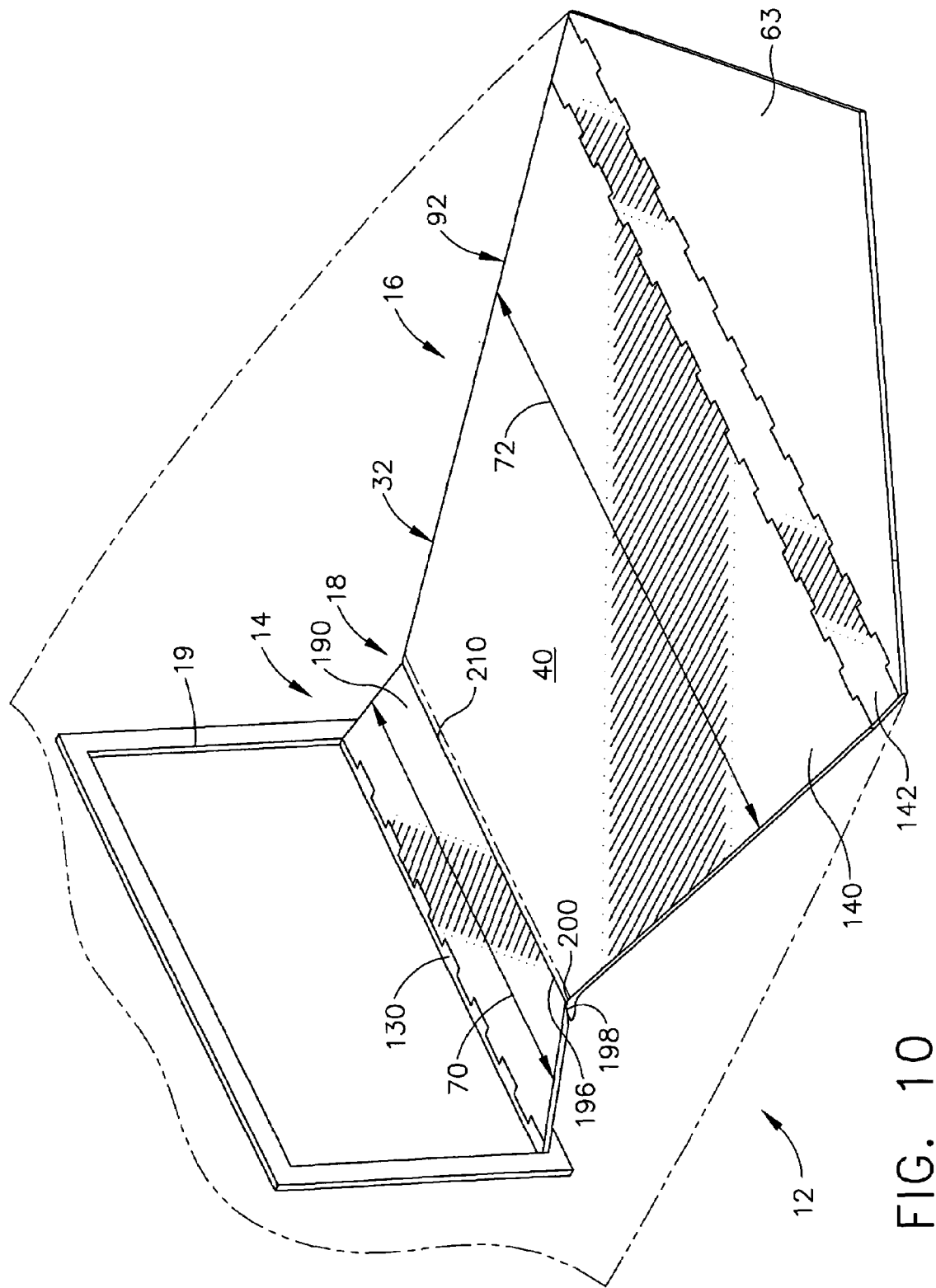
FIG. 10 is a perspective view illustration of a variable embodiment of a lower wall of the vectorable nozzle illustrated in FIG. 5.

A first variable embodiment of the lower wall 32 extends from the nozzle inlet 19 to the nozzle outlet 20 as illustrated in FIG. 10. This variable embodiment of the lower wall 32 includes a pivotable rectangular convergent lower ramp 190 pivotably mounted, with respect to the nozzle inlet 19, along a linear convergent ramp hinge line 130. The variable embodiment of the lower wall 32 extends from the nozzle inlet 19 through the convergent section 14 to the throat 18 which is a variable area throat. The divergent lower ramp 92 is also variable having a pivotable forward section 140 pivotably connected to a fixed aft section 142. This provides a variable area throat to exit area ratio A8/A9. This embodiment of the nozzle 12 allows the throat area and thus the exit area ratio A8/A9 to be varied during vectored and unvectored operation. The convergent lower ramp 190 has the constant width 70 and the divergent lower ramp 92 has the aftwardly diverging width 72.

Referring to FIG. 10, the pivotable rectangular convergent lower ramp 190 has a lower convergent trailing edge 196 overlapping a lower curved surface 198 of a lower divergent leading edge 200 of the pivotable forward section 140 of the divergent lower ramp 92. During engine operation, higher pressure in the convergent section 14 than in the divergent section 16 keeps the lower convergent trailing edge 196 sealed against the lower curved surface 198 of a divergent leading edge 200 of the pivotable forward section 140 of the divergent lower ramp 92. The lower curved surface 198 of the lower divergent leading edge 200 of the pivotable forward section 140 of the divergent lower ramp 92 provides sealing engagement of the pivotable rectangular convergent lower ramp 190 with the pivotable forward section 140 of the divergent lower ramp 92 along a convergent divergent slidable interface 210 over the full range of allowable pivoting motion of the pivotable rectangular convergent lower ramp 190 and the pivotable forward section 140 of the divergent lower ramp 92.

Figure 12:
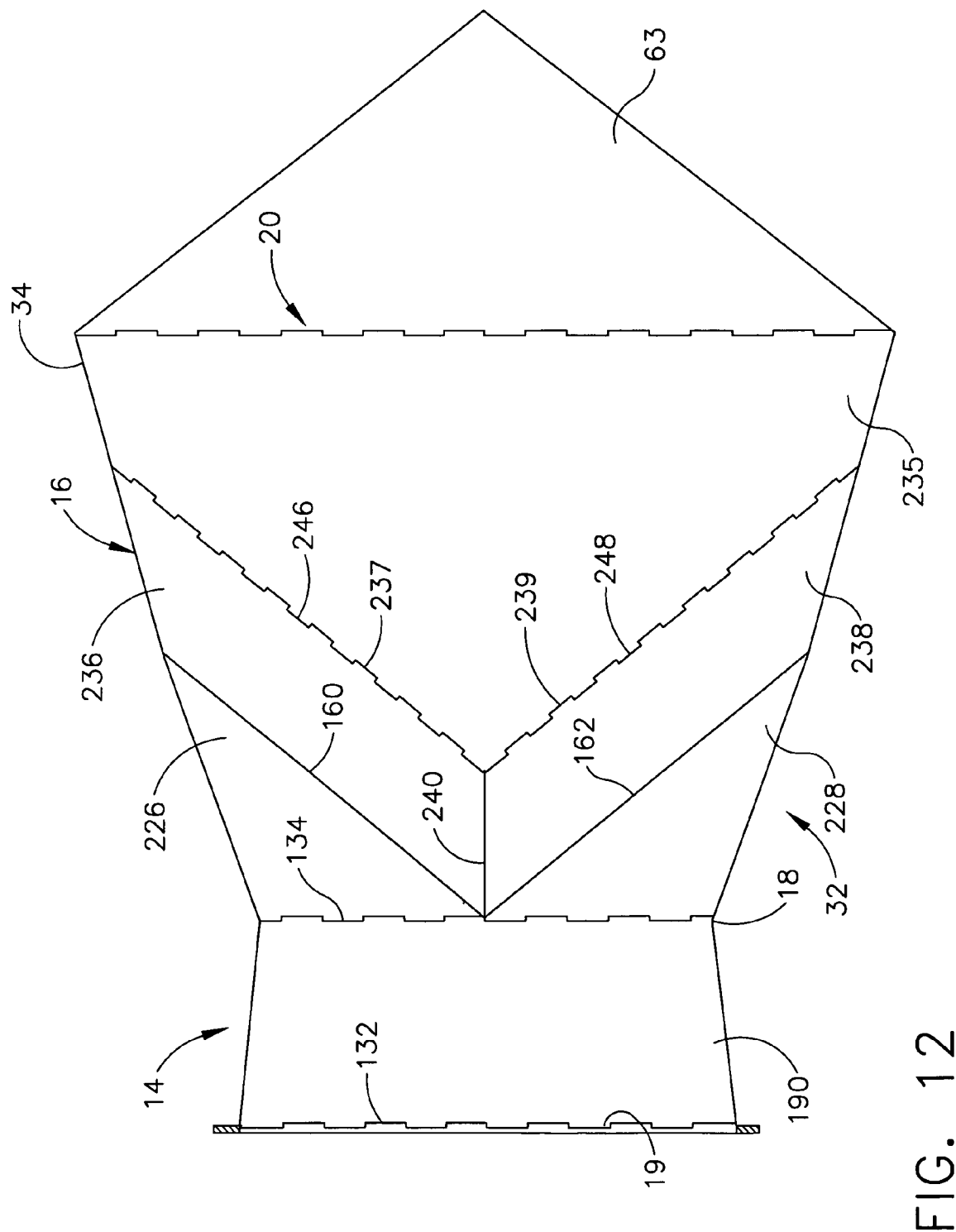
FIG. 12 is a downwardly looking planform view illustration of the lower wall illustrated in FIG. 11.

A second variable embodiment of the lower wall 32 extends from the nozzle inlet 19 to the nozzle outlet 20 as illustrated in FIGS. 11 and 12. This variable embodiment of the lower wall 32 includes a pivotable rectangular convergent lower ramp 190 pivotably mounted, with respect to the nozzle inlet 19, along a linear convergent ramp forward hinge line 132. The variable lower wall 32 includes triangular left and right side divergent lower panels 226 and 228 in the divergent section 16. The triangular left and right side divergent lower panels 226 and 228 are pivotably mounted to the pivotable rectangular convergent lower ramp 190 along a linear convergent ramp aft hinge line 134. The linear convergent ramp aft hinge line 134 is normal to the nozzle center plane 22 and generally defines the throat 18 along the lower wall 32 in an unvectored position of the nozzle 12.

The variable lower wall 32 also has pivotable parallelogram shaped left and right side aftwardly swept lower panels 236 and 238 pivotably attached to left and right side aftwardly swept leading edges 246 and 248 and along left and right side divergent angled hinge lines 237 and 239, respectively of a fixed divergent lower ramp 235 in the divergent section 16. The pitch vectoring flap 63 is pivotably attached to the fixed divergent lower ramp 235 at the aft end 34 of the lower wall 32.

The left side divergent lower panel 226 is in sealing engagement with the left side aftwardly swept lower panel 236 along a left side lower interface 160. The right side divergent lower panel 228 is in sealing engagement with the right side aftwardly swept lower panel 238 along a right side lower interface 162. The left and right side aftwardly swept lower panels 236 and 238 are in sealing engagement with each other along a center interface 240. This configuration allows the nozzle 12 to have a bit more vectoring as opposed to the nozzle 12 with the first two embodiments of the lower wall 32. Note the larger right side area AR of the throat 18 in FIG. 11.

Figure 13:
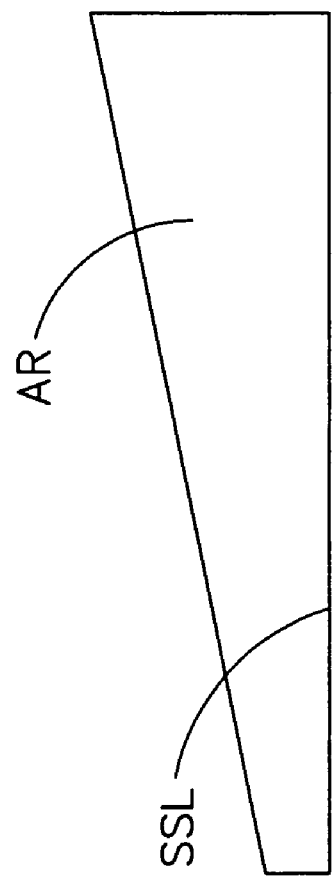
FIG. 13 is a schematical aft looking forward view illustration of a right side area of the skewed throat taken normal to the right side area of the skewed throat of the vectorable nozzle illustrated in FIG. 11.

The amount of vectoring increases as the side to side area (or mass flow) ratio AR/AL increases. As the nozzle 12 is moved further toward maximum vectoring, the sonic line SL, illustrated in FIG. 3, on the increasing side moves farther aft or downstream towards the left side divergent angled hinge line 37 on the upper wall 30 and the right side lower interface 162. Even if the sonic line SL is skewed on only half of the nozzle, the larger percentage of mass flow passes over a skewed sonic line SSL, as illustrated in FIG. 13, since the opposite half flow area has been reduced. The larger mass flow on the skewed half, on the right side area AR, dominates the direction of exiting nozzle mass flow and provides yaw vectoring.

Figure 15:
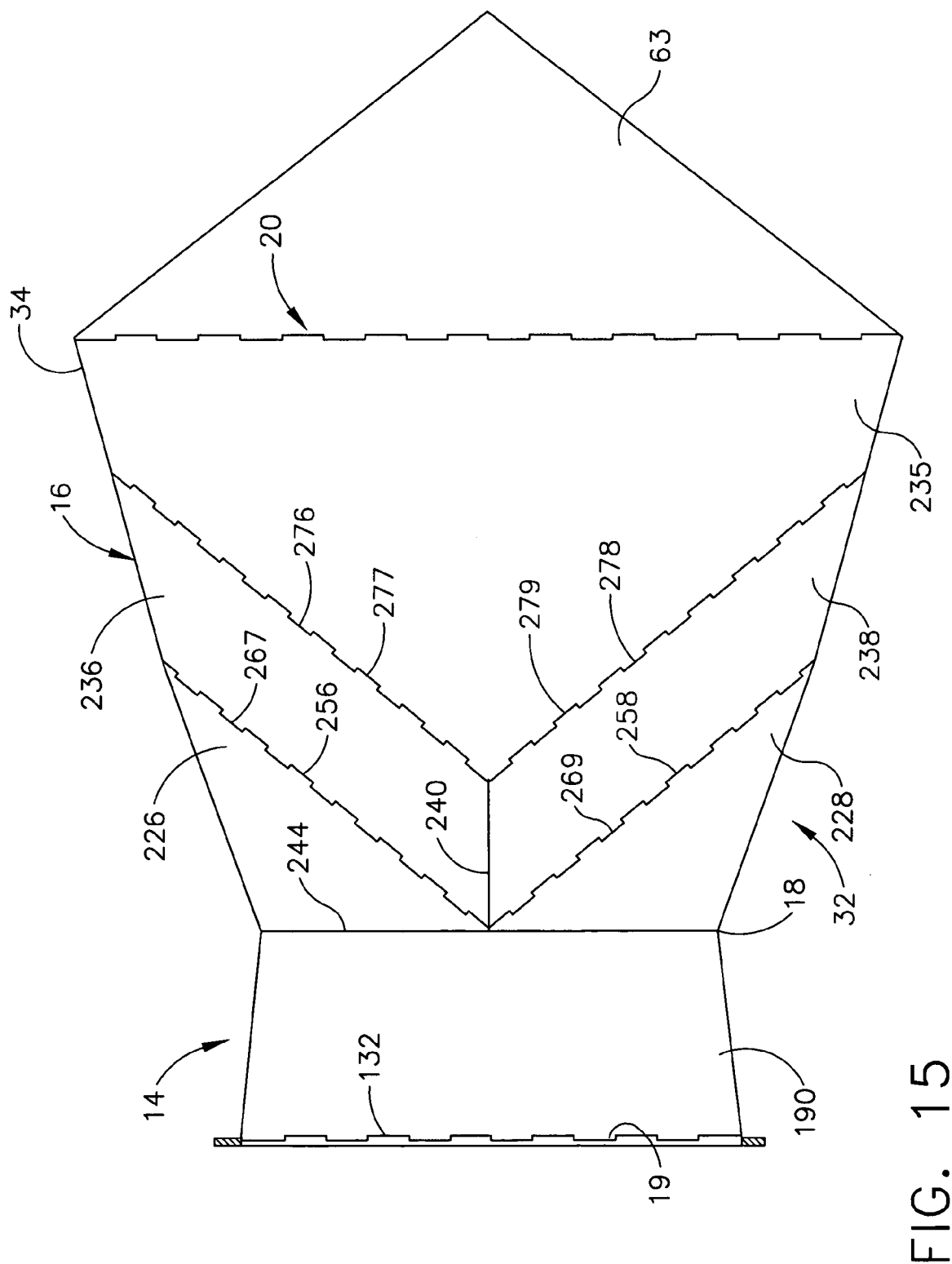
FIG. 15 is a downwardly looking planform view illustration of a third variable embodiment of the lower wall of the vectorable nozzle illustrated in FIG. 5.
Figure 16:
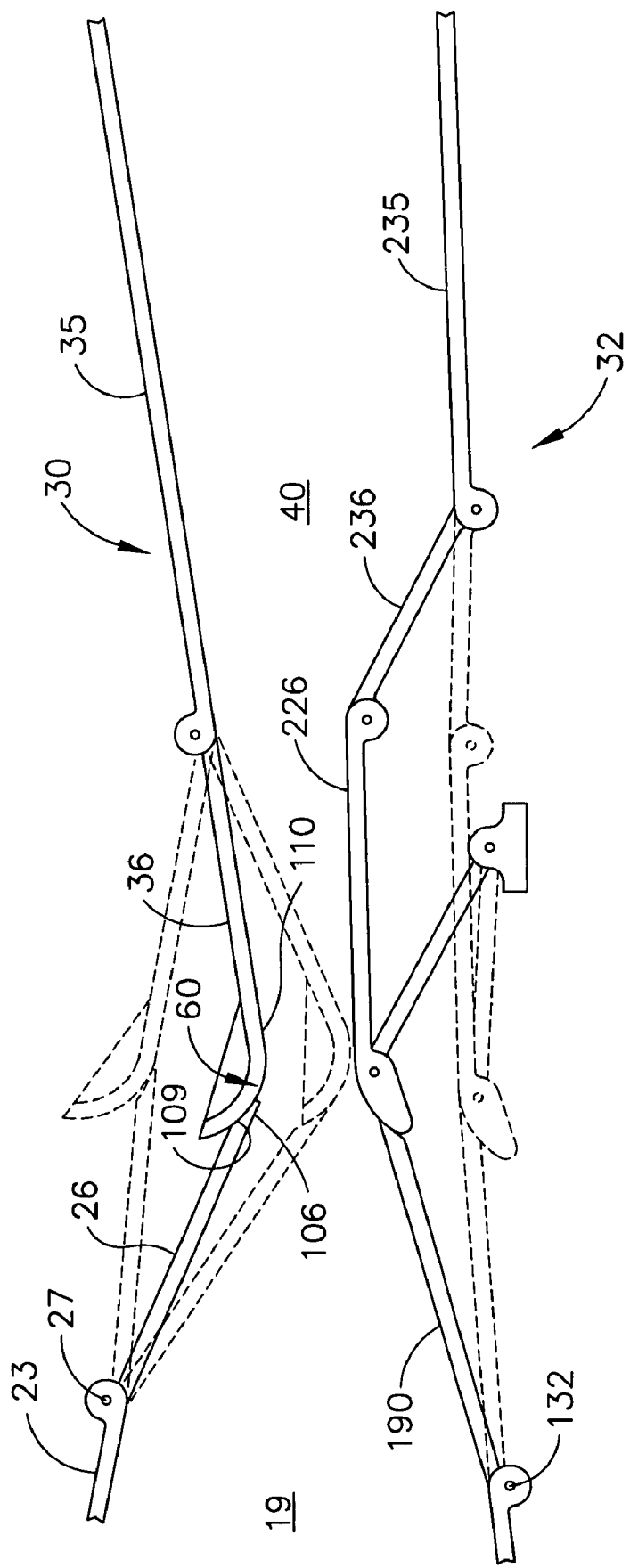
FIG. 16 is a schematical cross-sectional view illustration of the third variable embodiment of the lower wall illustrated in FIG. 15 taken through the vectorable nozzle along 8-8 in FIG. 5.

A third variable embodiment of the lower wall 32 extends from the nozzle inlet 19 to the nozzle outlet 20 as illustrated in FIGS. 15 and 16. This variable embodiment of the lower wall 32 is similar to the one illustrated in FIGS. 11 and 12 but the triangular left and right side divergent lower panels 226 and 228 are pivotably mounted to the parallelogram shaped left and right side aftwardly swept lower panels 236 and 238 by left and right side divergent angled first hinge lines 267 and 269 along left and right side aftwardly swept first leading edges 256 and 258 respectively. The left and right side divergent and convergent lower panels 226 and 236 are in sealing engagement with the pivotable rectangular convergent lower ramp 190 along a linear convergent ramp aft interface 244. The pivotable parallelogram shaped left and right side aftwardly swept lower panels 236 and 238 are pivotably attached to left and right side aftwardly swept second leading edges 276 and 278 and along left and right side divergent second angled hinge lines 277 and 279 of the fixed divergent lower ramp 235 in the divergent section 16, respectively.

The pivotable panels between the sidewalls within the vectorable nozzle provide an aircraft gas turbine engine with a thrust vectoring and low radar observability. The nozzle disclosed herein also can have a variable throat area (A8) and afterburning thrust augmentation for loaded takeoff and evasive maneuvers. The nozzle also has the ability to vary the nozzle exit area (A9) as well to provide for A9/A8 variation to optimize performance over an aircraft's mission.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A vectorable nozzle comprising:
   convergent and divergent sections in serial downstream flow relationship with a throat therebetween and extending aftwardly from a two-dimensional rectangular flow nozzle inlet to a nozzle outlet,
   triangular left and right side convergent upper panels pivotably mounted to a triangular convergent upper ramp in the convergent section along left and right side convergent angled hinge lines respectively,
   triangular left and right side divergent upper panels pivotably attached to a triangular divergent upper ramp in the divergent section along left and right side divergent angled hinge lines respectively,
   the left side convergent upper panel in sealing engagement with the left side divergent upper panel along a left side upper interface, and
   the right side convergent upper panel in sealing engagement with the right side divergent upper panel along a right side interface.

2. A vectorable nozzle as claimed in claim 1,
   the left and right side divergent upper panels and the left and right side convergent upper panels outwardly bounding a portion of a nozzle flowpath of the nozzle,
   the left side convergent and divergent upper panels being operable to pivot inwardly into the nozzle flowpath while the right side convergent and divergent upper panels pivot outwardly from the nozzle flowpath, arid
   the left side convergent and divergent upper panels being operable to pivot outwardly from the nozzle flowpath while the right side convergent and divergent upper panels pivot inwardly into the nozzle flowpath.

3. A vectorable nozzle as claimed in claim 1 further comprising the convergent section having a constant width normal to a nozzle center plane and the divergent section having an aftwardly diverging width.

4. A vectorable nozzle as claimed in claim 1 further comprising the left and right side convergent upper panels having convergent trailing edges overlapping curved surfaces of divergent leading edges of the left and right side divergent upper panels respectively.

5. A vectorable nozzle as claimed in claim 4 further comprising the convergent section having a constant width normal to the nozzle center plane and the divergent section having an aftwardly diverging width.

6. A vectorable nozzle as claimed in claim 4 further comprising the divergent section including a triangular trailing edge defining at least in part the nozzle outlet.

7. A vectorable nozzle as claimed in claim 2 further comprising:
   convergent and divergent sections and between left and right sidewalls, and
   side edges of the left and right side convergent upper panels and the left and right side divergent upper panels in sealing engagement with convergent and divergent conically contoured portions of the left and right sidewalls in the convergent and divergent sections respectively.

8. A vectorable nozzle comprising:
convergent and divergent sections and between left and right sidewalls,
the convergent and divergent sections in serial downstream flow relationship with a throat therebetween and extending aftwardly from a two-dimensional flow nozzle inlet to a nozzle outlet,
a nozzle center plane extending aftwardly from the nozzle inlet to the nozzle outlet,
an unvectored throat plane normal to the nozzle center plane,
heightwise spaced apart upper and lower walls outwardly bounding a nozzle flowpath of the nozzle and extending aftwardly through the convergent and divergent sections from the nozzle inlet to the nozzle outlet,
the upper wall including triangular pivotable left and right side convergent upper panels pivotable about left and right side leading edges of the left and right side convergent upper panels respectively in the convergent section,
triangular left and right side divergent upper panels pivotably attached to a triangular divergent upper ramp in the divergent section along left and right side divergent angled hinge lines respectively,
the left side convergent upper panel in sealing engagement with the left side divergent upper panel along a left side interface,
the right side convergent upper panel in sealing engagement with the right side divergent upper panel along a right side interface, and
the left and right side upper interfaces being aligned in the unvectored throat plane when the throat is in an unvectored position.

9. A vectorable nozzle as claimed in claim 8 further comprising a pitch vectoring flap pivotably attached to the nozzle outlet at an aft end of the lower wall.

10. A vectorable nozzle as claimed in claim 9 further comprising the vectoring flap substantially defining an equilateral triangle having a base pivotably attached to the nozzle outlet at an aft end of the lower wall and extending aftwardly from the base to an apex.

11. A vectorable nozzle as claimed in claim 8 further comprising the convergent section having a constant width and the divergent section having an aftwardly diverging width.

12. A vectorable nozzle as claimed in claim 8,
the left and right side divergent upper panels and the left and right side convergent upper panels outwardly bounding the nozzle flowpath,
the left side convergent and divergent upper panels operable to pivot inwardly into the nozzle flowpath while the right side convergent and divergent upper panels pivot outwardly from the flowpath, and
the left side convergent and divergent upper panels operable to pivot outwardly from the nozzle flowpath while the right side convergent and divergent upper panels pivot inwardly into the nozzle flowpath.

13. A vectorable nozzle as claimed in claim 12 further comprising the left and right side convergent upper panels having convergent trailing edges overlapping curved surfaces of divergent leading edges of the left and right side divergent upper panels respectively.

14. A vectorable nozzle as claimed in claim 13 further comprising the divergent section including a triangular trailing edge defining at least in part the nozzle outlet.

15. A vectorable nozzle as claimed in claim 14 further comprising:
a pitch vectoring flap pivotably attached to the nozzle outlet at an aft end of the lower wall,
the vectoring flap substantially defining an equilateral triangle having a base pivotably attached to the nozzle outlet at the aft end of the lower wall, and
the vectoring flap extending aftwardly from the base to an apex.

16. A vectorable nozzle as claimed in claim 8 further comprising the lower wall being fixed with respect to the nozzle inlet and including in serial downstream relationship a fixed rectangular convergent lower ramp attached to a fixed divergent lower ramp.

17. A vectorable nozzle as claimed in claim 16 further comprising the left and right side convergent upper panels having convergent trailing edges overlapping curved surfaces of divergent leading edges of the left and right side divergent upper panels respectively.

18. A vectorable nozzle as claimed in claim 17 further comprising:
a pitch vectoring flap pivotably attached to the nozzle outlet at an aft end of the lower wall,
the vectoring flap substantially defining an equilateral triangle having a base pivotably attached to the nozzle outlet at the aft end of the lower wall, and
the vectoring flap extending aftwardly from the base to an apex.

19. A vectorable nozzle as claimed in claim 8 further comprising the lower wall being variable and including a pivotable rectangular convergent lower ramp pivotably mounted with respect to the nozzle inlet along a linear convergent ramp hinge line.

20. A vectorable nozzle as claimed in claim 19 further comprising the left and right side convergent upper panels having convergent trailing edges overlapping curved surfaces of divergent leading edges of the left and right side divergent upper panels respectively.

21. A vectorable nozzle as claimed in claim 20 further comprising:
a pitch vectoring flap pivotably attached to the nozzle outlet at an aft end of the lower wall,
the vectoring flap substantially defining an equilateral triangle having a base pivotably attached to the nozzle outlet at the aft end of the lower wall, and
the vectoring flap extending aftwardly from the base to an apex.

22. A vectorable nozzle as claimed in claim 8 further comprising:
the lower wall being variable and including a pivotable rectangular convergent lower ramp pivotably mounted with respect to the nozzle inlet along a linear convergent ramp forward hinge line,
triangular left and right side divergent lower panels pivotably mounted to the convergent lower ramp along a linear convergent ramp aft hinge line and located in the divergent section, and
pivotable parallelogram shaped left and right side aftwardly swept lower panels pivotably attached to a fixed divergent lower ramp in the divergent section at left and right side divergent angled hinge lines along left and right side aftwardly swept leading edges respectively of the fixed divergent lower ramp.

23. A vectorable nozzle as claimed in claim 22 further comprising the linear convergent ramp hinge line being normal to the nozzle center plane and generally defining the throat along the lower wall in an unvectored position of the nozzle.

24. A vectorable nozzle as claimed in claim 22 further comprising:
   the left side divergent lower panel in sealing engagement with the left side aftwardly swept lower panel along a left side lower interface,
   the right side divergent lower panel in sealing engagement with the right side aftwardly swept lower panel along a right side lower interface, and
   the left side aftwardly swept lower panel in sealing engagement with the right side aftwardly swept lower panel along a center interface.

25. A vectorable nozzle as claimed in claim 24 further comprising the left and right side convergent upper panels having convergent trailing edges overlapping curved surfaces of divergent leading edges of the left and right side divergent upper panels respectively.

26. A vectorable nozzle as claimed in claim 24 further comprising:
   a pitch vectoring flap pivotably attached to the nozzle outlet at an aft end of the lower wall,
   the vectoring flap substantially defining an equilateral triangle having a base pivotably attached to the nozzle outlet at the aft end of the lower wall, and
   the vectoring flap extending aftwardly from the base to an apex.

27. A vectorable nozzle as claimed in claim 8 further comprising:
   the lower wall being variable and including a pivotable rectangular convergent lower ramp pivotably mounted with respect to the nozzle inlet along a linear convergent ramp forward hinge line,
   pivotable parallelogram shaped left and right side aftwardly swept lower panels pivotably attached to a fixed divergent lower ramp in the divergent section at left and right side divergent second angled hinge lines along left and right side aftwardly swept leading edges second leading edges respectively of the fixed divergent lower ramp, and
   triangular left and right side divergent lower panels pivotably mounted to the parallelogram shaped left and right side aftwardly swept lower panels at left and right side divergent angled first hinge lines along left and right side aftwardly swept first leading edges of the parallelogram shaped left and right side aftwardly swept lower panels respectively.

28. A vectorable nozzle as claimed in claim 27 further comprising the left and right side divergent and convergent lower panels in sealing engagement with the pivotable rectangular convergent lower ramp along a linear convergent ramp aft interface.

* * * * *

UNITED STATES PATENT AND TRADEMARK OFFICE
CERTIFICATE OF CORRECTION

PATENT NO. : 7,475,548 B2 Page 1 of 1
APPLICATION NO. : 11/223606
DATED : January 13, 2009
INVENTOR(S) : Michael A. Toffan et al.

It is certified that error appears in the above-identified patent and that said Letters Patent is hereby corrected as shown below:

Claim 2, column 8, line 41, please change "arid" to --and--.

Claim 7, column 9, line 3, please change "sect ions" to --sections--.

Signed and Sealed this

Twenty-eighth Day of April, 2009

JOHN DOLL
*Acting Director of the United States Patent and Trademark Office*